(12) United States Patent
Mamat

(10) Patent No.: US 10,870,897 B2
(45) Date of Patent: Dec. 22, 2020

(54) METHOD OF EDGE IMPRINTING OF LEATHER SUBSTRATES

(71) Applicant: K H EXPORTS INDIA PRIVATE LIMITED, Chennai (IN)

(72) Inventor: Omer Suat Mamat, Chennai (IN)

(73) Assignee: K H EXPORTS INDIA PRIVATE LIMITED, Chennai (IN)

( * ) Notice: Subject to any disclaimer, the term of this patent is extended or adjusted under 35 U.S.C. 154(b) by 0 days.

(21) Appl. No.: 16/814,306

(22) Filed: Mar. 10, 2020

(65) Prior Publication Data

US 2020/0208229 A1 Jul. 2, 2020

Related U.S. Application Data

(63) Continuation of application No. PCT/IN2018/050783, filed on Nov. 26, 2018.

(30) Foreign Application Priority Data

Mar. 13, 2018 (IN) .............................. 201741032416

(51) Int. Cl.
*C14C 11/00* (2006.01)
*B44C 1/175* (2006.01)
*C09D 175/04* (2006.01)
*C14B 1/56* (2006.01)

(52) U.S. Cl.
CPC .......... *C14C 11/006* (2013.01); *B44C 1/1756* (2013.01); *C09D 175/04* (2013.01); *C14B 1/56* (2013.01)

(58) Field of Classification Search
None
See application file for complete search history.

(56) References Cited

U.S. PATENT DOCUMENTS

| 439,536 A | 10/1890 | Maxwell |
| 1,629,165 A | 5/1927 | Johnston |
| 2,029,377 A * | 2/1936 | Kaplan ................. B44C 1/1712 428/203 |
| 3,794,544 A * | 2/1974 | Eckert ....................... B44C 1/17 156/230 |
| 3,930,921 A | 1/1976 | Connett |

(Continued)

OTHER PUBLICATIONS

International Search Report dated Mar. 4, 2019 from PCT Application No. PCT/IN2018/050783.

*Primary Examiner* — Barbara J Musser
(74) *Attorney, Agent, or Firm* — Innovation Capital Law Group, LLP; Vic Lin

(57) ABSTRACT

The present invention relates to a method for enhancing leather edge imprinting. More particularly, the present invention relates to transferring the print from the transparent paper to the edges of a material. Further, the present invention enables in tailoring the designs or written logos on the edge surface for desired applications. The method [100] for imprinting a pattern on edges of a leather substrate comprises of steps with pattern imprinted on the edge across the perimeter of the leather substrate. The pattern comprises one or more customized colors, text, names, company brands, slogans, patterns, images, graphics, photographs, logos, advertisements, or a combination thereof. Advantageously, the present invention effectively saves time and material wastage.

15 Claims, 6 Drawing Sheets

(56) References Cited

U.S. PATENT DOCUMENTS

| | | | |
|---|---|---|---|
| 5,298,072 A | | 3/1994 | Schiele et al. |
| 5,643,982 A | * | 7/1997 | Liu .......................... C09J 11/00 |
| | | | 524/267 |
| 5,941,101 A | * | 8/1999 | Callo ...................... B24B 9/002 |
| | | | 451/188 |
| 5,944,931 A | | 8/1999 | Cranford |
| 5,948,586 A | | 9/1999 | Hare |
| 6,835,268 B2 | | 12/2004 | Widman |
| 2004/0245490 A1 | | 12/2004 | Schopke et al. |

\* cited by examiner

FIGURE: 1
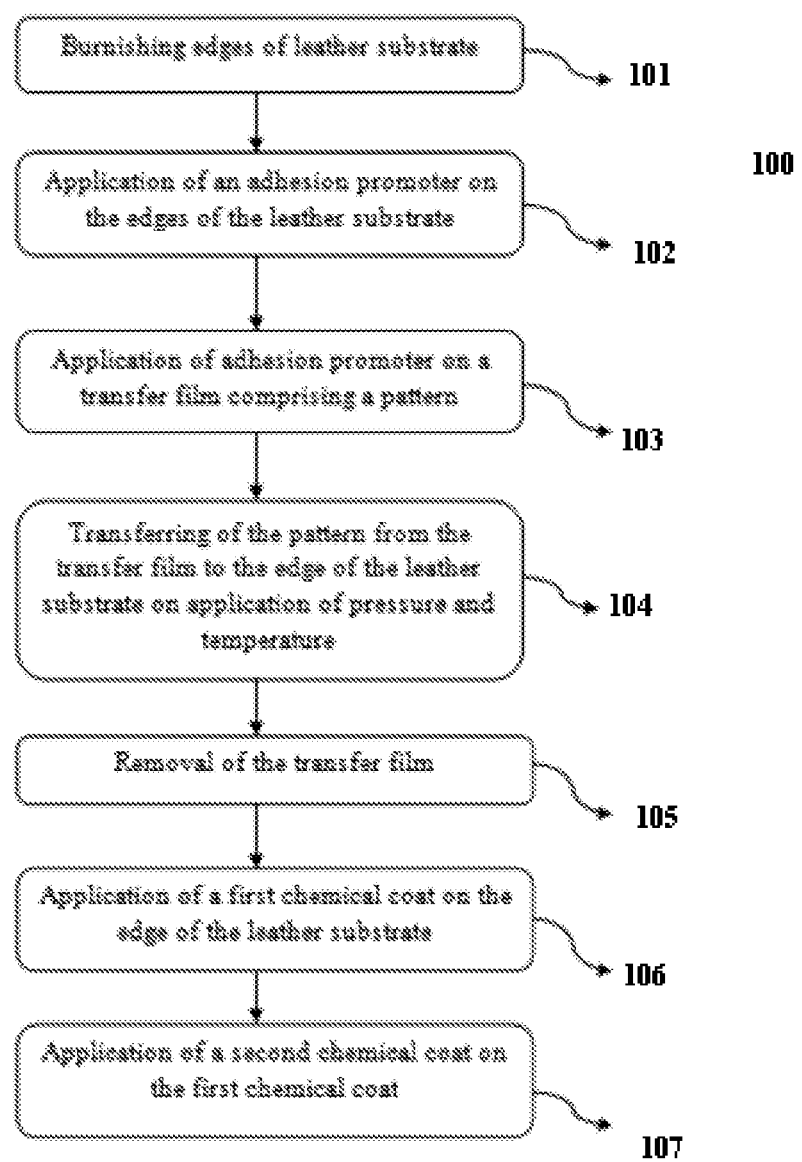

FIGURE: 2
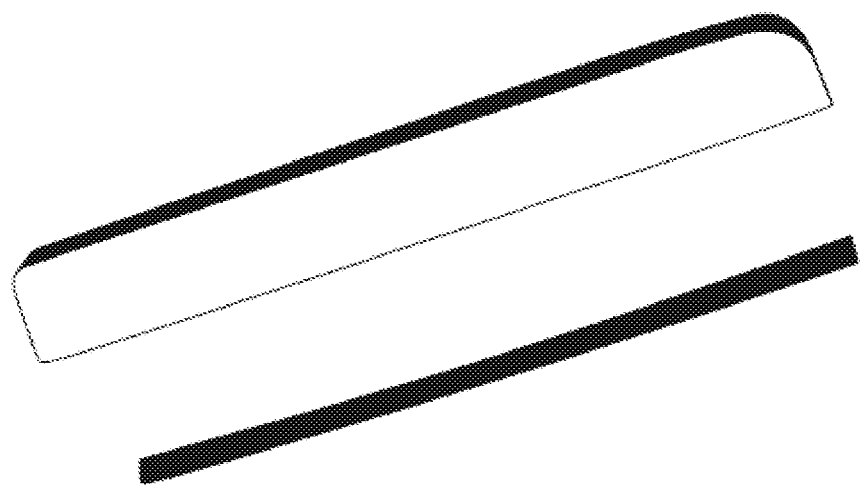
FIGURE: 3
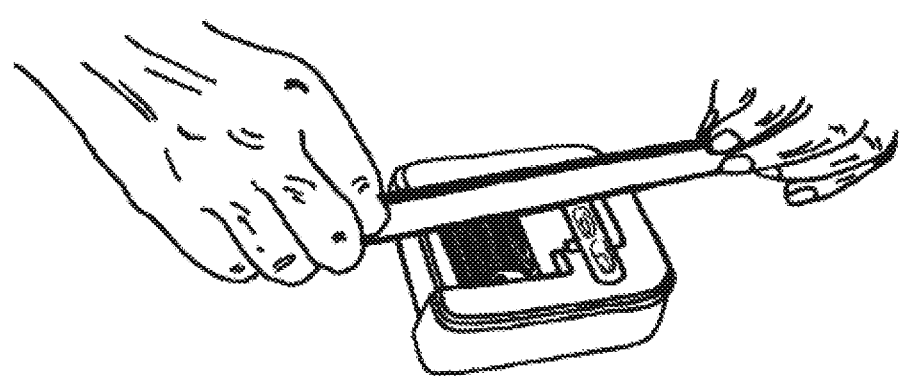

FIGURE: 4
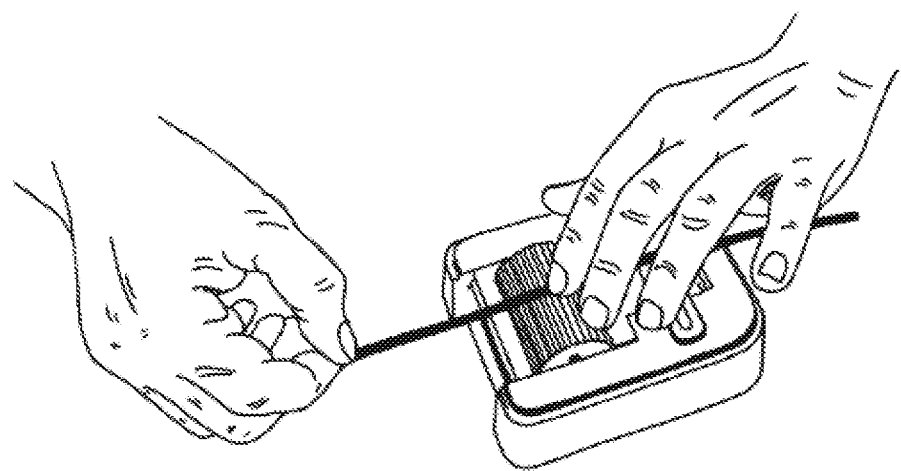
FIGURE: 5
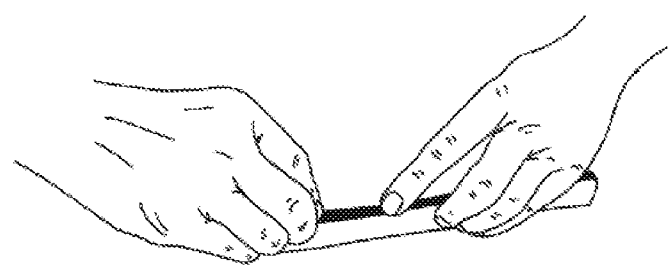

FIGURE: 6
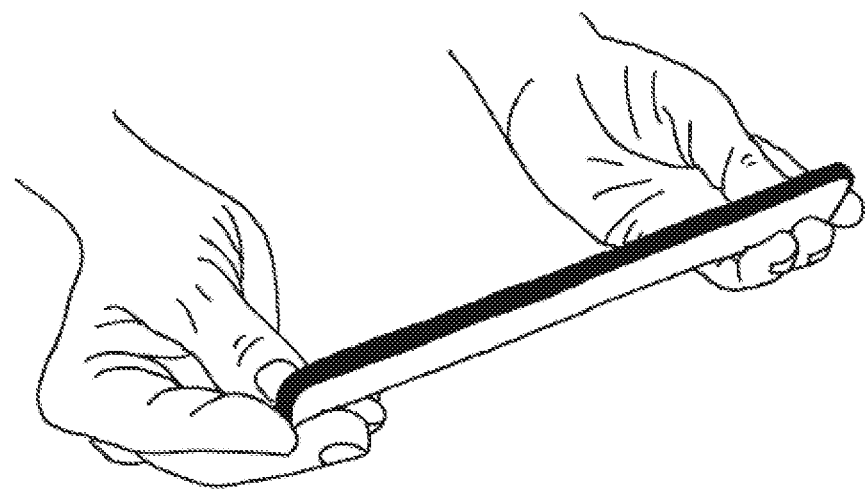
FIGURE: 7
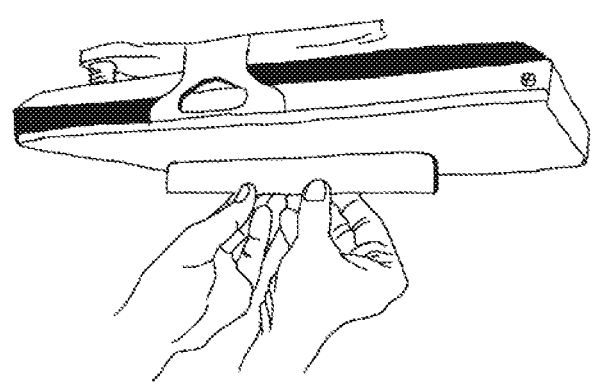

FIGURE: 8
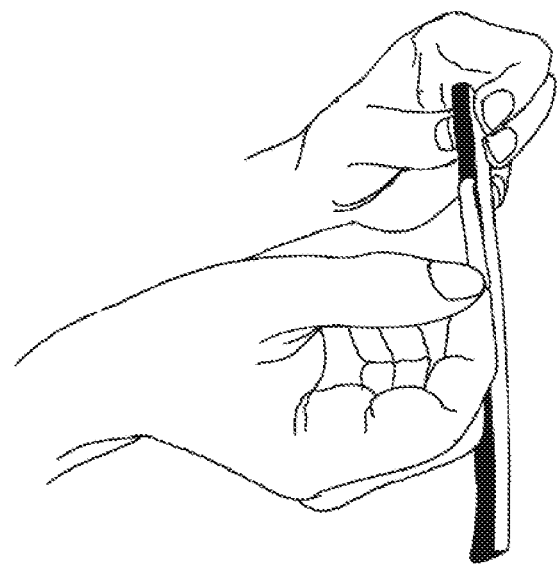
FIGURE: 9
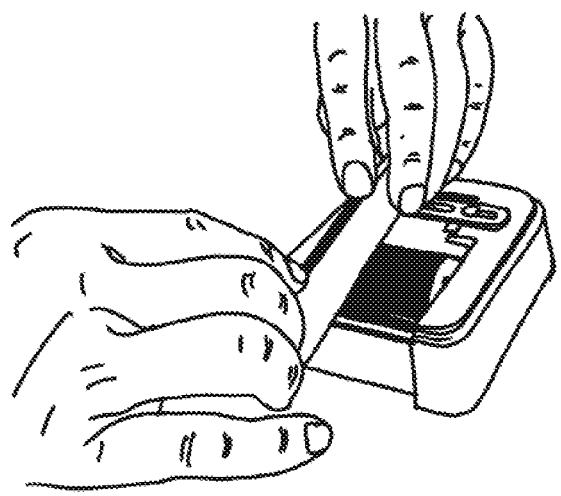

FIGURE: 10
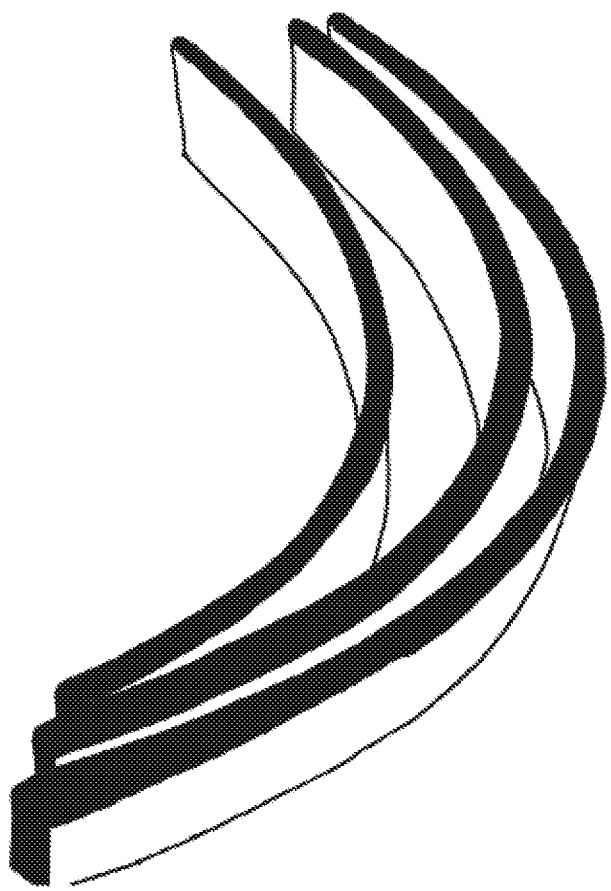

METHOD OF EDGE IMPRINTING OF LEATHER SUBSTRATES

FIELD OF THE INVENTION

The present invention relates to a method for enhancing leather edge imprinting. More particularly, the present invention relates to transferring the print from the transparent paper to the edges of a material. Further, the present invention enables in tailoring the designs or written logos on the edge surface for desired applications. Advantageously, the present invention effectively saves time and material wastage.

BACKGROUND OF THE INVENTION

Generally, in the field of leather processing, edge coloring treatment is a very important stage, usually leather shaders are used for achieving colored leather, which includes ink cartridge and ink wheel, the ink is applied to the surface of the leather during rotation of ink wheel.

Known in the art is a process of leather coloring, using ink cartridge and a roller assembly, the ink in the ink cartridge by rolling the wheel of the wheel assembly achieves operation of leather coloring, but its larger diameter roller is only suitable for conventional shape leather, and there is a certain degree of difficulty in coloring. The coloring using smaller diameter rollers, will result in a smaller volume of the ink cartridge and the ink cannot be fully utilized by the colored wheel and leads to wastage of ink.

U.S. Pat. No. 5,298,072 describes a system for coating the edges of panels (and other types and forms of workpieces) in which the panel is moved along a conveyor past a painting station, so that the edge of the panel moves longitudinally past the applicator head, which serves as both a spray head to apply the paint and a vacuum head to remove excess paint. The applicator head is shaped to have a complementary shape to the shape of the edge of the panel, and as the panel moves past the applicator head, paint is applied and excess paint is removed to leave the smooth finish. Problems with this prior art system are found in uneven coating of the applied liquid on the workpiece, undesired buildup of the liquid on parts of the system and high cost of maintenance.

U.S. Pat. No. 3,930,921A discloses a method of finishing leather. An improved method of finishing leather by transferring a finish coating, at least the outer stratum of which comprises a thermoplastic, adhesive acrylic polymer, from a release layer bearing the finish coating to the leather. The leather to be coated (which may be supported on an appropriate backing layer) and the release layer are pressed into a sandwich-like assembly with the concurrent application of sufficient heat and pressure to transfer substantially the entire finish coating to the surfaces of the leather and the backing layer juxtaposed therewith. Transfer of the finish coating is effected without the application of any adhesive material or "tie coat" prior to pressing the coating into contact with the leather, by virtue of the thermoplastic, adhesive characteristics of the acrylic finish coating per se. However the method is not for imprinting edges of the leather substrates.

U.S. Pat. No. 439,536A discloses a process of transferring prints or designs. The invention relates to the transferring of printed matter to china, glass, leather, or other Surfaces, its object being to provide a simple means of making this transfer from wood-cuts, stereotype-plates, type, or other like printing means and to form the same upon the glass or other Surface, whether it be of flat, oval, or other contour. However the process of transferring prints or designs cannot be done in minute edges of the leather substrates.

U.S. Pat. No. 1,629,165A discloses a method of and composition for transferring designs, pictures, and the like. This invention relates to a composition for, and a method of ornamenting and decorating textiles, wearing apparel, leather goods, parchments, furniture, walls, and is wood work for interior decorations and the like, by transferring or reproducing thereon designs, flowers, and other representations in water-colors of varying and controllable degree of intensity, or as a production in oil. However the method cannot be done in minute edges of the leather substrates.

The method may be carried out batch-wise employing discrete backing and release layers for the transfer of finish coatings to individual leather pieces. Alternatively, the method may be performed continuously with the successive feed of leathers to be coated between a transfer web providing the desired release layer and a supporting web imparting the requisite backing or support.

Accordingly, there exists a need for a simple and efficient method that lessens the burden of painful edge imprinting procedures by reducing wastage such as ink, water and material, and further saves lead-time and energy as well.

OBJECTS OF THE INVENTION

It is the primary object of the present invention to enhance edge imprinting method by adding new aesthetic look to the products.

It is another object of the present invention to simplify surface cleaning and avoid first and second coat application difficulties.

It is another object of the present invention to add designs or written logos on the edge surface.

It is another object of the present invention to improve existing edge imprinting method.

It is another object of the present invention to use single or mixed colors, degradation or multiple colors in edge imprinting method.

It is another object of the present invention to use branded letters and tailor the designs or written logos on the edge surface for desired applications and brand visibility.

It is another object of the present invention to save time and energy in terms of work, cleaning, application, heating time for drying, buffing and to reduce wastage such as ink, material, water, etc.

It is another object of the present invention to use manual tool or machine for the edge imprinting method.

SUMMARY OF THE INVENTION

One or more of the problems of the conventional prior art may be overcome by various embodiments of the present invention.

It is the primary aspect of the present invention to provide a method [100] for imprinting a pattern on edges of a leather substrate, comprising the steps of:
  burnishing [101] edges of the leather substrate;
  application [102] of an adhesion promoter on the edges of the leather substrate, followed by drying for a pre-defined period of time;
  application [103] of the adhesion promoter on a transfer film comprising a pattern;
  transferring [104] of the pattern from the transfer film to the edge of the leather substrate on application of pressure and temperature, followed by drying for a pre-defined period of time;

removal [105] of the transfer film;
application [106] of a first chemical coat on the edge of the leather substrate and drying for a predefined period of time; and
application [107] of a second chemical coat on the first chemical coat and drying for a pre-defined period of time,
characterized in that, a pattern is imprinted on the edge across the perimeter of the leather substrate.

It is another aspect of the present invention, wherein the pattern comprises one or more customized colors, text, names, company brands, slogans, patterns, images, graphics, photographs, logos, advertisements, or a combination thereof.

It is another aspect of the present invention, wherein the transfer of the pattern from the transfer film to the edge of the leather substrate is performed at a temperature of about 110-130° C.

It is another aspect of the present invention, wherein the adhesion promoter comprises of Aziridine in demineralized water at a concentration of 25-35% w/v.

It is another aspect of the present invention, wherein the first chemical coat comprises of a dispersion of fumed silica (40% w/v) in aqueous Polyurethane solution 60% w/v.

It is another aspect of the present invention, wherein the second chemical coat is a composition comprising of:
polyurethanes in water dispersion (80-85% w/v);
polyacrylic acid resin in water dispersion (5-10% w/v);
(2-methoxymethylethoxy)propanol (1-2%); and
silicon Dioxide (3.5-5.5%).

It is another aspect of the present invention, wherein the predefined period for drying of the adhesion promoter is 5-15 seconds.

It is another aspect of the present invention, wherein the predefined period for drying of the first chemical coat and the second chemical coat is 25-40 minutes.

It is another aspect of the present invention, wherein the edge of leather substrate comprises a pattern which is protected by a chemical coating.

BRIEF DESCRIPTION OF THE DRAWINGS

So that the manner in which the features, advantages and objects of the invention, as well as others which will become apparent, may be understood in more detail, more particular description of the invention briefly summarized above may be had by reference to the embodiment thereof which is illustrated in the appended drawings, which form a part of this specification. It is to be noted, however, that the drawings illustrate only a preferred embodiment of the invention and is therefore not to be considered limitation of the invention's scope as it may admit to other equally effective embodiments.

FIG. 1: illustrates the flowchart of the method for imprinting a pattern on edges of a leather substrate according to one embodiment of the present invention.

FIG. 2: illustrates the front view of the leather substrate and the transfer film according to another embodiment of the present invention.

FIG. 3: illustrates the perspective view of the application of an adhesion promoter on the edges of the leather substrate according to another embodiment of the present invention.

FIG. 4: illustrates the perspective view of the application of the adhesion promoter on a transfer film according to another embodiment of the present invention.

FIG. 5: illustrates the perspective view of the attachment of the transfer film according to another embodiment of the present invention.

FIG. 6: illustrates the perspective view of the leather substrate after attachment of the transfer film according to another embodiment of the present invention.

FIG. 7: illustrates the perspective view of the heat treatment for the transfer film on the leather substrate according to another embodiment of the present invention.

FIG. 8: illustrates the perspective view of the removal of the transfer film from the leather substrate according to another embodiment of the present invention.

FIG. 9: illustrates the perspective view of the application of the final chemical coat on the leather substrate according to another embodiment of the present invention.

FIG. 10: illustrates the perspective view of the final leather substrate with pattern or design according to another embodiment of the present invention.

DETAILED DESCRIPTION OF THE INVENTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The present invention relates to a method for enhancing leather edge imprinting. More particularly, the present invention relates to transferring the print from the transparent paper to the edges of a material. Further, the present invention enables in tailoring the designs or written logos on the edge surface for desired applications. Advantageously, the present invention effectively saves time and material wastage.

Referring to FIG. 1, it illustrates the flowchart of the method for imprinting a pattern on edges of a leather substrate according to one embodiment of the present invention. The method [100] for imprinting a pattern on edges of a leather substrate, comprises the following steps. The edges of the leather substrate are burnished [101]. The adhesion promoter is applied [102] on the edges of the leather substrate, followed by drying for a pre-defined period of time. The adhesion promoter is applied [103] on a transfer film comprising a pattern. The pattern is transferred [104] from the transfer film to the edge of the leather substrate on application of pressure and temperature, followed by drying for a pre-defined period of time. The transfer film is removed [105]. The first chemical coat is applied [106] on the edge of the leather substrate and drying for a predefined period of time. The second chemical coat is applied [107] on the first chemical coat and drying for a pre-defined period of time. A pattern is imprinted on the edge across the perimeter of the leather substrate.

The pattern comprises one or more customized colors, text, names, company brands, slogans, patterns, images, graphics, photographs, logos, advertisements, or a combination thereof. The transfer of the pattern from the transfer film to the edge of the leather substrate is performed at a temperature of about 110-130° C. The adhesion promoter comprises of Aziridine in demineralized water at a concentration of 25-35% w/v. The first chemical coat comprises of a dispersion of fumed silica (40% w/v) in aqueous Polyurethane solution 60% w/v. The second chemical coat is a composition comprises of polyurethanes in water dispersion (80-85% w/v), polyacrylic acid resin in water dispersion (5-10% w/v), (2-methoxymethylethoxy)propanol (1-2%) and silicon Dioxide (3.5-5.5%).

The predefined period for drying of the adhesion promoter is 5-15 seconds. The predefined period for drying of the first chemical coat and the second chemical coat is 25-40 minutes. The edge of leather substrate comprises a pattern which is protected by a chemical coating.

All types of leather belts are done with 2.5 mm to 3.5 mm thickness on the edge of the leather and all types of leather substrates are printed from 0.8 mm to 3.5 mm thickness on the edge of the leather.

The transfer film is made from polyurethane and fillers in solvent dispersion. The transfer film is used for industrial product for sticker print.

| Ingredients data | | |
| --- | --- | --- |
| Main components | CAS NO | HR-260 |
| Aziridine | 151-56-4 | 25-35% |
| Soft-water | 7732-18-5 | Balance |
| Physical and chemical properties | | |
| Appearance | White viscous Paste | |
| Odour | Weak odour | |
| Flash point | ND | |
| Boiling point | About 100° C. | |
| Ionicity | Anion | |
| PH value | 7.5-8.5 (25° C., 50.0 g/L) | |
| Solubility | Soluble in water in any percentage | |

The first chemical is made from polyurethane and fillers in water dispersion. The first chemical is used for industrial product for sticker print. The chemical contains dangerous chemicals.

| Ingredients data | | |
| --- | --- | --- |
| Main components | CAS NO | HR-260 |
| Aqueous Polyurethane dispersion | 51852-81-4 | 60.00% |
| Fumed silica | 7631-86-9 | 40.00% |
| Physical and chemical properties | | |
| Appearance | Colorless fluid | |
| Color | Colorless | |
| Odour | Light | |
| pH (at 100 g/l, Water at 20° C.) | 8.5 | |
| Flash point | N.A. | |
| Boiling point range (° C.) | 100 | |
| Melting point range (° C.) | 0 | |
| Density at (20° C.) | 1.05 | |
| Vapour pressure at 20° C. (mm Hg) | N.A. | |
| Explosive properties | N.A. | |
| Water solubility | MISCIBLE | |
| Solubility in organic solvents | NOT MISCIBLE | |

The second chemical is made from polyurethane and fillers in water dispersion. The second chemical is used for industrial product for sticker print. The chemical contains dangerous chemicals.

| Ingredients data | | |
| --- | --- | --- |
| Main components | CAS NO | HR-260 |
| Polyurethanes in water dispersion | Proprietary mixture | 80-85% |
| Polyacrylic acid resin in water dispersion | Proprietary mixture | 5-10% |
| (2-methoxymethylethoxy) propanol | 34590-94-8 | 1-2% |
| Silicon dioxide | 7631-84-9 | 3.5-5.5% |
| Physical and chemical properties | | |
| Appearance | Milky fluid | |
| Color | Various | |
| Odour | Light | |
| pH (at 100 g/l, Water at 20° C.) | 7.0 | |
| Flash point | N.A. | |
| Boiling point range (° C.) | 100 | |
| Melting point range (° C.) | 0 | |
| Density at (20° C.) | 1.05 | |
| Vapour pressure at 20° C. (mm Hg) | N.A. | |
| Explosive properties | N.A. | |
| Water solubility | MISCIBLE | |
| Solubility in organic solvents | NOT MISCIBLE | |

Referring to FIG. 2, it illustrates the front view of the leather substrate and the transfer film according to another embodiment of the present invention. Any type of leather substrate is taken. All types of leather belts are done with 2.5 mm to 3.5 mm thickness on the edge of the leather and all types of leather substrates are printed from 0.8 mm to 3.5 mm thickness on the edge of the leather. A transfer film with logos and patterns and any other designs is taken.

Referring to FIG. 3, it illustrates the perspective view of the application of an adhesion promoter on the edges of the leather substrate according to another embodiment of the present invention. The first coating of the adhesion promoter is applied on the edges of the leather substrate. The adhesion promoter is preferably a UA400H promoter.

Referring to FIG. 4, it illustrates the perspective view of the application of the adhesion promoter on a transfer film according to another embodiment of the present invention.

Referring to FIG. 5, it illustrates the perspective view of the attachment of the transfer film according to another embodiment of the present invention.

Referring to FIG. 6, it illustrates the perspective view of the leather substrate after attachment of the transfer film according to another embodiment of the present invention.

Referring to FIG. 7, it illustrates the perspective view of the heat treatment for the transfer film on the leather substrate according to another embodiment of the present invention.

Referring to FIG. 8, it illustrates the perspective view of the removal of the transfer film from the leather substrate according to another embodiment of the present invention.

Referring to FIG. 9, it illustrates the perspective view of the application of the final chemical coat on the leather substrate according to another embodiment of the present invention.

Referring to FIG. 10, it illustrates the perspective view of the final leather substrate with pattern or design according to another embodiment of the present invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

I claim:

1. A method [100] for imprinting a pattern on edges of a leather substrate, comprising the steps of:
    burnishing [101] edges of the leather substrate;
    application [102] of an adhesion promoter on the edges of the leather substrate, followed by drying for a pre-defined period of time;
    application [103] of the adhesion promoter on a transfer film comprising a pattern;
    transferring [104] of the pattern from the transfer film to the edge of the leather substrate on application of pressure and temperature, followed by drying for a pre-defined period of time;
    removal [105] of the transfer film;
    application [106] of a first chemical coat on the edge of the leather substrate and drying for a predefined period of time; and
    application [107] of a second chemical coat on the first chemical coat and drying for a pre-defined period of time,
    wherein the first chemical coat comprises of a dispersion of fumed silica (40% w/v) in aqueous Polyurethane solution 60% w/v.

2. The method for imprinting a pattern on edges of a leather substrate as claimed in claim 1, wherein the pattern comprises one or more customized colors, text, names, company brands, slogans, patterns, images, graphics, photographs, logos, advertisements, or a combination thereof.

3. The method for imprinting a pattern on edges of a leather substrate as claimed in claim 1, wherein the transfer of the pattern from the transfer film to the edge of the leather substrate is performed at a temperature of about 110-130° C.

4. The method for imprinting a pattern on edges of a leather substrate as claimed in claim 1, wherein the adhesion promoter comprises of Aziridine in demineralized water at a concentration of 25-35% w/v.

5. The method for imprinting a pattern on edges of a leather substrate as claimed in claim 1, wherein the second chemical coat is a composition comprising of:
    polyurethanes in water dispersion (80-85% w/v);
    polyacrylic acid resin in water dispersion (5-10% w/v);
    (2-methoxymethylethoxy)propanol (1-2%); and
    silicon Dioxide (3.5-5.5%).

6. The method for imprinting a pattern on edges of a leather substrate as claimed in claim 1, wherein the pre-defined period for drying of the adhesion promoter is 5-15 seconds.

7. The method for imprinting a pattern on edges of a leather substrate as claimed in claim 1, wherein the pre-defined period for drying of the first chemical coat and the second chemical coat is 25-40 minutes.

8. The method for imprinting a pattern on edges of a leather substrate as claimed in claim 1, further comprising protecting a pattern on the edge of the leather substrate with a chemical coating.

9. A method [100] for imprinting a pattern on edges of a leather substrate, comprising the steps of:
    burnishing [101] edges of the leather substrate;
    application [102] of an adhesion promoter on the edges of the leather substrate, followed by drying for a pre-defined period of time;
    application [103] of the adhesion promoter on a transfer film comprising a pattern;
    transferring [104] of the pattern from the transfer film to the edge of the leather substrate on application of pressure and temperature, followed by drying for a pre-defined period of time;
    removal [105] of the transfer film;
    application [106] of a first chemical coat on the edge of the leather substrate and drying for a predefined period of time; and
    application [107] of a second chemical coat on the first chemical coat and drying for a pre-defined period of time,
    wherein the second chemical coat is a composition comprising:
        polyurethanes in water dispersion (80-85% w/v);
        polyacrylic acid resin in water dispersion (5-10% w/v);
        (2-methoxymethylethoxy)propanol (1-2%); and
        silicon Dioxide (3.5-5.5%).

10. The method for imprinting a pattern on edges of a leather substrate as claimed in claim 9, wherein the pattern comprises one or more customized colors, text, names, company brands, slogans, patterns, images, graphics, photographs, logos, advertisements, or a combination thereof.

11. The method for imprinting a pattern on edges of a leather substrate as claimed in claim 9, wherein the transfer of the pattern from the transfer film to the edge of the leather substrate is performed at a temperature of about 110-130° C.

12. The method for imprinting a pattern on edges of a leather substrate as claimed in claim 9, wherein the adhesion promoter comprises of Aziridine in demineralized water at a concentration of 25-35% w/v.

13. The method for imprinting a pattern on edges of a leather substrate as claimed in claim 9, wherein the pre-defined period for drying of the adhesion promoter is 5-15 seconds.

14. The method for imprinting a pattern on edges of a leather substrate as claimed in claim 9, wherein the pre-defined period for drying of the first chemical coat and the second chemical coat is 25-40 minutes.

15. The method for imprinting a pattern on edges of a leather substrate as claimed in claim 9, further comprising protecting a pattern on the edge of the leather substrate with a chemical coating.

* * * * *